Patented May 25, 1943

2,320,112

UNITED STATES PATENT OFFICE 2,320,112

STORAGE OF SUPERCOOLED NORMALLY CRYSTALLINE POLYMERIC MATERIAL

Ralph M. Wiley, Midland, Mich., assignor to The Dow Chemical Company, Midland, Mich., a corporation of Michigan No Drawing. Application December 6, 1940, Serial No. 368,908

3 Claims. (Cl. 18—48)

This invention relates to a method of treating crystalline polymers prior to cold-working the same, and to the products obtained by such method.

By the term "crystalline polymer" as used in this specification and claims, is meant the solid products whether polymers, co-polymers, interpolymers, or otherwise named, obtained by polymerizing, separately or in combination, substances containing an ethylenic double bond such, for example, as monomeric vinylidene chloride or ethylene or other suitable monomers in major proportion with one or more other polymerizable materials such as vinyl chloride, vinyl acetate, styrene, the esters of acrylic or methacrylic acid, allyl and related esters of carboxylic or inorganic acids, unsaturated ethers, etc., and which normally exhibit characteristic X-ray diffraction patterns.

By the term "completely fused mass" as used in this specification and claims, is meant a normally crystalline polymeric mass from which all crystallinity has disappeared, as evidenced by the disappearance of its characteristic X-ray diffraction pattern. This condition is produced by heating the crystalline polymer to a temperature generally at least about 15 centigrade degrees above the softening point.

Polymerized vinylidene chloride can be deformed plastically at ordinary molding temperatures, e. g., 150°–170° C., only by the use of very high pressures and then only to produce simple forms where little plastic flow is required. U. S. Patent 2,183,602 discloses that vinylidene chloride and co-polymers thereof can be readily molded under moderate pressures if they are first subjected to a treatment which comprises completely fusing the normally crystalline polymer and, subsequently, while the material is still in a non-crystalline condition, chilling it rapidly to produce a super-cooled mass. This super-cooled mass remains in a plastic and workable state for at least 2 to 60 minutes depending upon the crystalline polymer which is being utilised and the modifying agents therein. This material is capable of being readily cold-worked, e. g., extruded, rolled, or molded, but it is necessary to carry out any such cold-working operations soon after obtaining the super-cooled mass. If such further fabrication is postponed, the material becomes very tough and highly resistant to deformation, due to crystallization of the polymer, whereby any further operations of this type become extremely difficult.

It has now been discovered that normally crystalline polymers may be maintained in the substantially non-crystalline condition previously described (herein called the "super-cooled" state) for long periods of time whereby the necessity for prompt cold working the super-cooled mass is eliminated. In general, normally crystalline polymers may be maintained in the super-cooled, substantially non-crystalline condition for periods ranging up to several months or longer by maintaining them at temperatures below about 10° C., and preferably in the range between about 0° C. and about −90° C.

As a specific example of my invention, a crystalline polymer composed essentially of 90% vinylidene chloride, 10% vinyl chloride, and containing 7% of di-(alpha-phenyl-ethyl) ether as a plasticizer, was extruded in $\frac{1}{16}$ inch diameter rods at 200° C. and plunged into water maintained at 0° C. to produce a soft, pliable, super-cooled, shaped mass. A five-foot section of this super-cooled rod was placed in a refrigerated chamber which was maintained at a temperature of −27° C., a second five-foot section was placed in a chamber utilising dry ice as the refrigerating medium to maintain the chamber at a temperature of −90° C., while a third section was allowed to stand at room temperature and a fourth section was placed in an oven held at a temperature of 75° C. At the end of one hour, the same which was maintained at 75° C. was hard, tough, and difficult to stretch, while the sample maintained at room temperature (about 23° C.) had hardened considerably and could be stretched only if the operation was carried out slowly and carefully. The samples maintained at −27° C. and at −90° C. were hard and brittle but when a portion of each was warmed to room temperature it became as soft and pliable as the product when first super-cooled. After 24 hours, the sections kept at and above room temperature were so hard and tough that they could no longer be cold-worked by hand, while after six months the sections kept in the refrigerated chambers were still soft and pliable and readily stretched by hand after warming to room temperature.

The new process is as readily applicable to super-cooled sheets, tapes, films, and tubing, and other shaped, super-cooled, crystalline, polymeric articles and masses as it is to rods.

It has been found that the present process is readily applicable to crystalline polymers containing minor amounts of plasticizers, coloring agents, fillers, heat stabilizing agents and the like when used in such amounts that the crystallinity of the polymer is not affected. While the present invention has been described with particular reference to the fabrication of a vinylidene chloride-vinyl chloride co-polymer it will be understood that the process is as readily applicable to other crystalline polymers. Thus, the invention may be carried out in a similar manner and with like results while operating on the co-polymers of vinylidene chloride or other vinylidene halides and such co-polymerisable, unsaturated compounds as vinyl acetate, styrene, vinyl cyanide, methyl methacrylate, ethyl acrylate, di-allyl oxalate, chloro-allyl-chloro-acetate and the like, so long as the proportion of vinylidene halide and co-polymer compound are such as to produce crystalline polymers.

I claim:

1. The method which comprises providing a completely fused mass of a normally crystalline polymer selected from the class consisting of vinylidene chloride and its crystalline co-polymers, chilling the fused mass to produce a supercooled material, and maintaining the said material at a temperature below about 10° C.

2. The method which comprises completely fusing a normally crystalline polymer selected from the class consisting of vinylidene chloride and its crystalline co-polymers, chilling the fused mass to below 20° C., and maintaining the chilled product at a temperature in the range between about 0° C. and about −90° C.

3. The method which comprises providing a completely fused mass of a normally crystalline polymer selected from the class consisting of vinylidene chloride and its crystalline co-polymers, chilling the fused mass to below 10° C., and maintaining the chilled product at a temperature in the range between about 0° C. and about −90° C.

RALPH M. WILEY.